Figure 1:
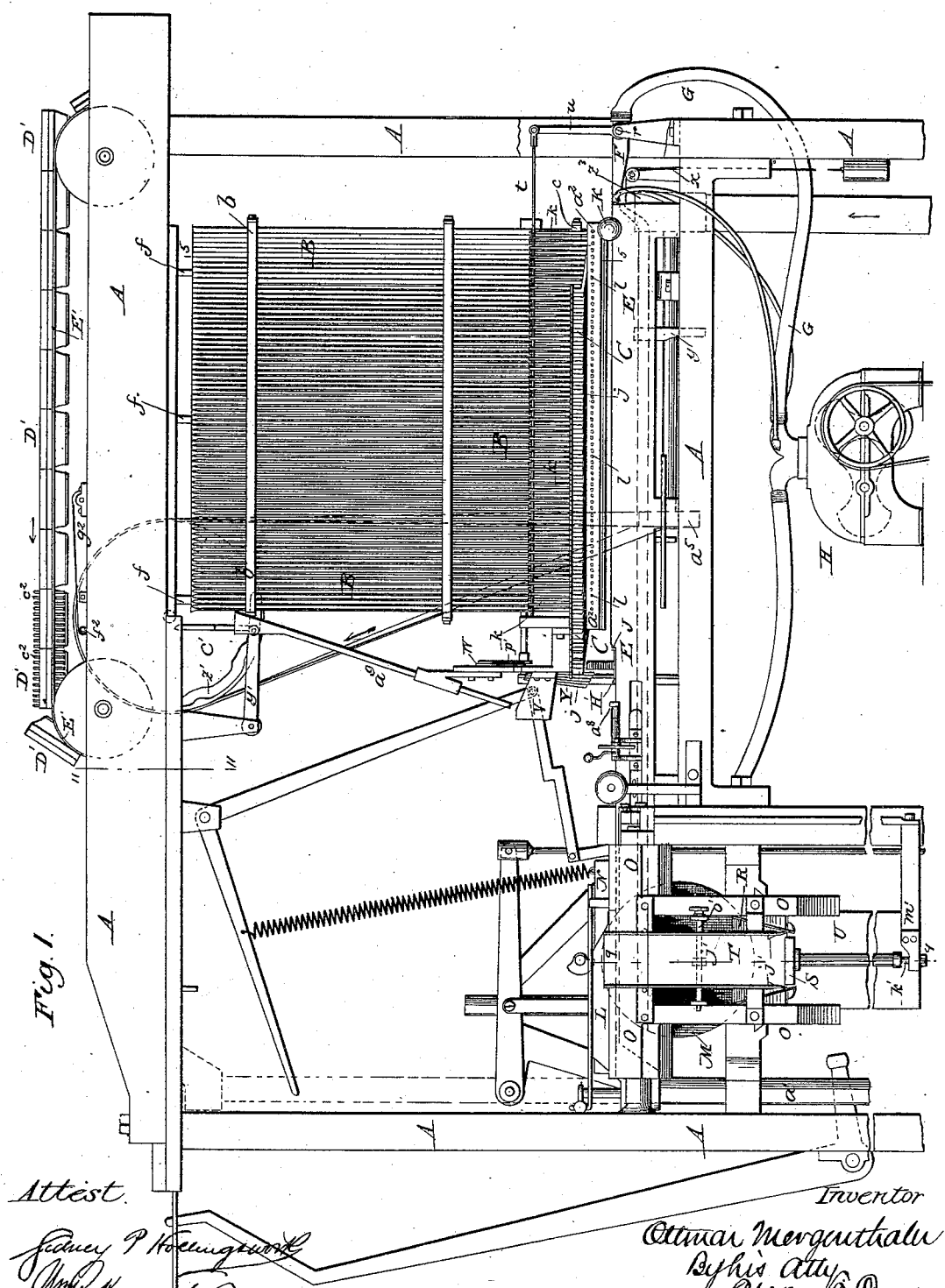

(No Model.) 12 Sheets—Sheet 1.

O. MERGENTHALER.
MACHINE FOR PRODUCING TYPE BARS.

No. 347,629. Patented Aug. 17, 1886.

Attest.
Inventor
Ottmar Mergenthaler
By his Atty
Philip T. Dodge

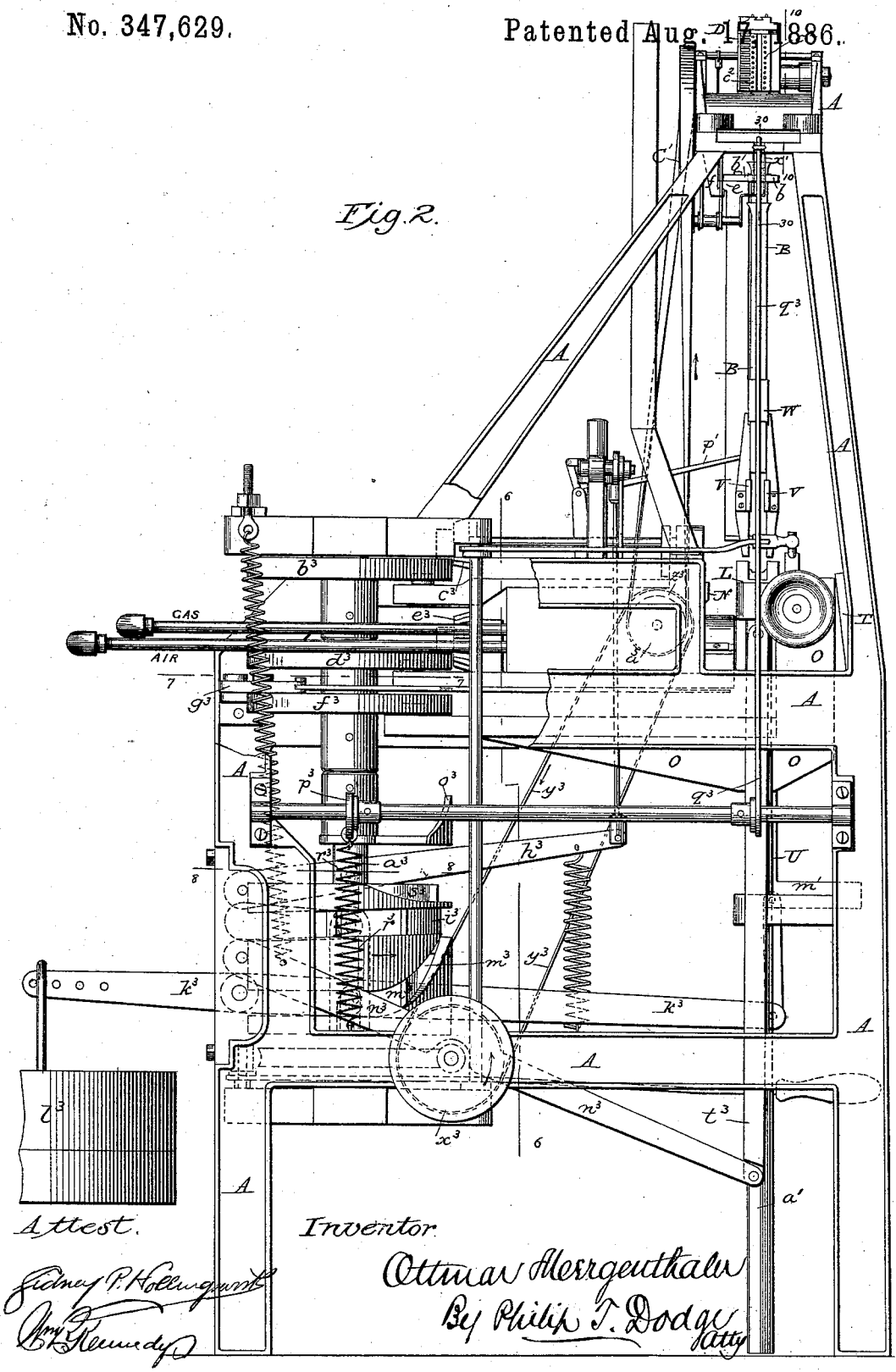

(No Model.)  12 Sheets—Sheet 3.
O. MERGENTHALER.
MACHINE FOR PRODUCING TYPE BARS.
No. 347,629.  Patented Aug. 17, 1886.
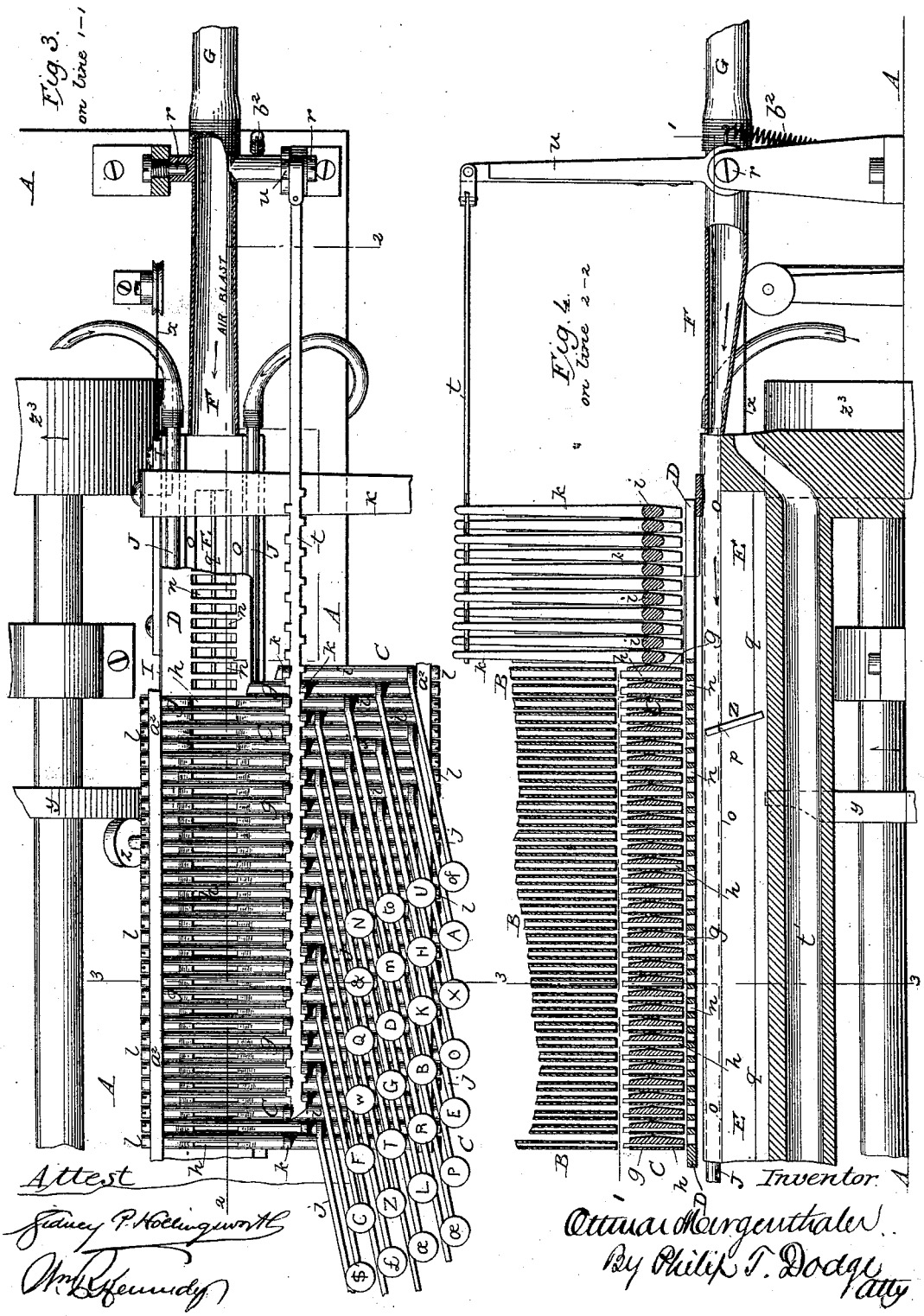

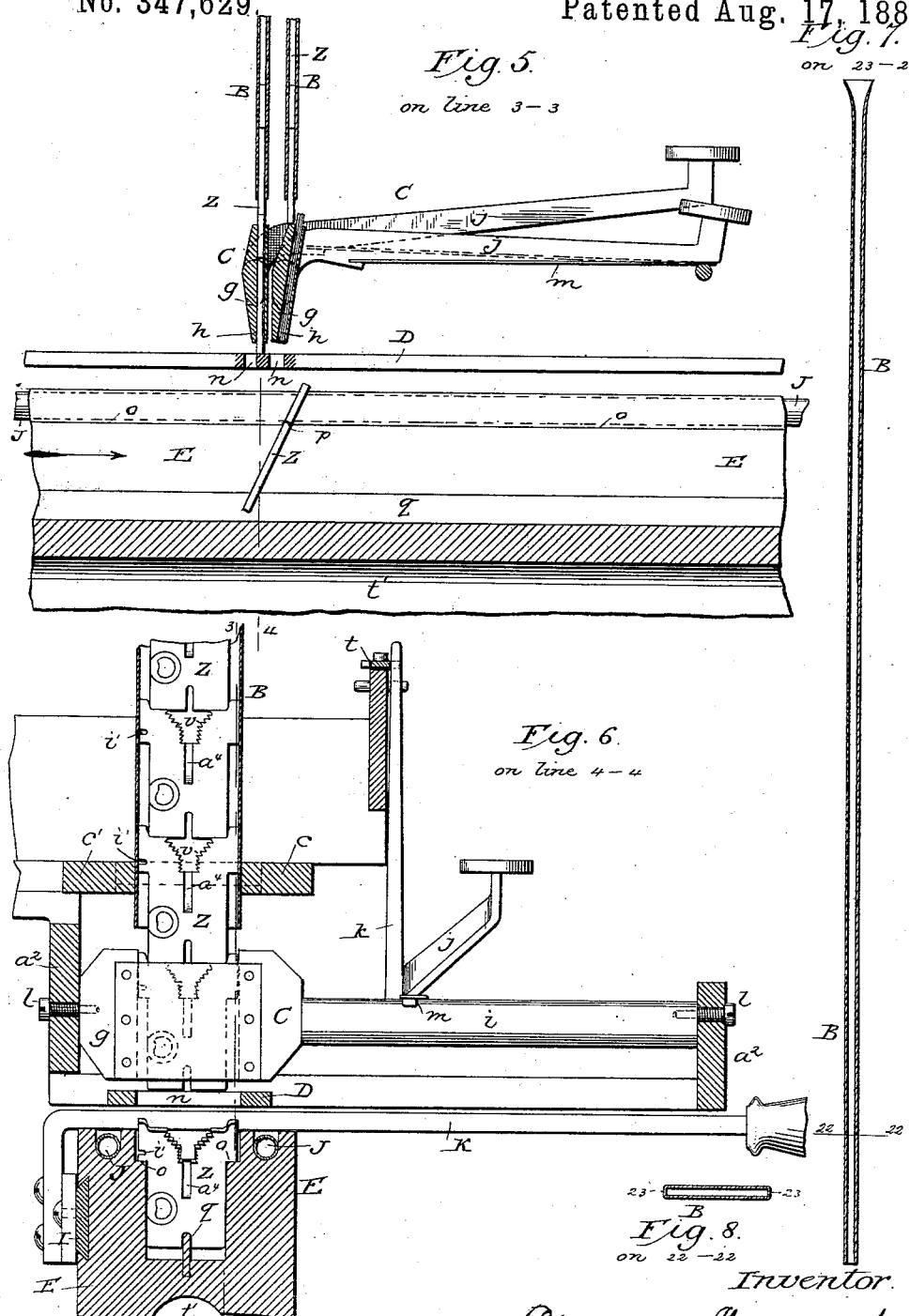

(No Model.)  12 Sheets—Sheet 5.
O. MERGENTHALER.
MACHINE FOR PRODUCING TYPE BARS.
No. 347,629. Patented Aug. 17, 1886.
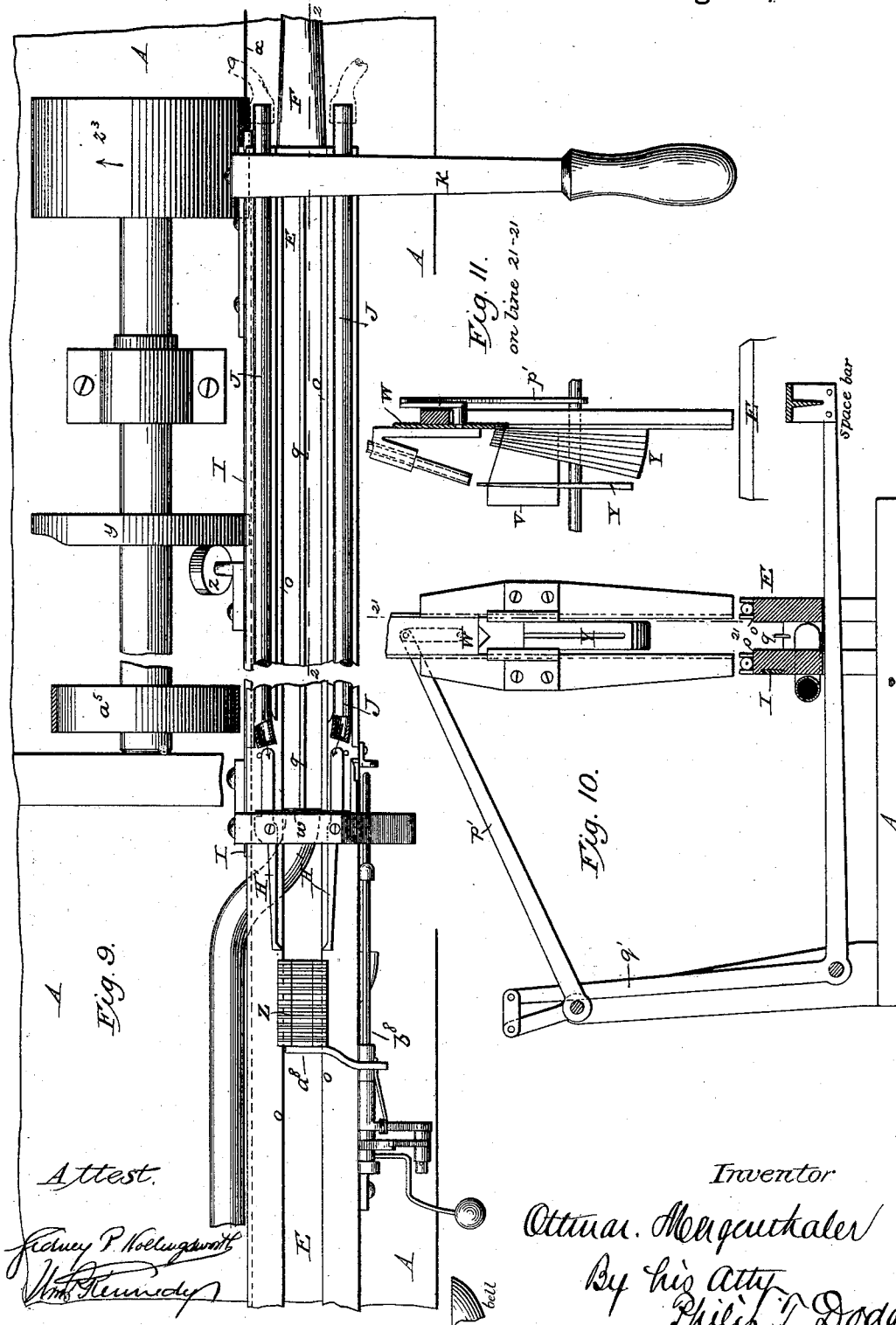
Attest:
Sidney P. Hollingsworth
Wm. F. Kennedy
Inventor
Ottmar Mergenthaler
By his Atty
Philip T. Dodge
N. PETERS, Photo-Lithographer, Washington, D. C.

(No Model.) 12 Sheets—Sheet 6.
O. MERGENTHALER.
MACHINE FOR PRODUCING TYPE BARS.
No. 347,629. Patented Aug. 17, 1886.
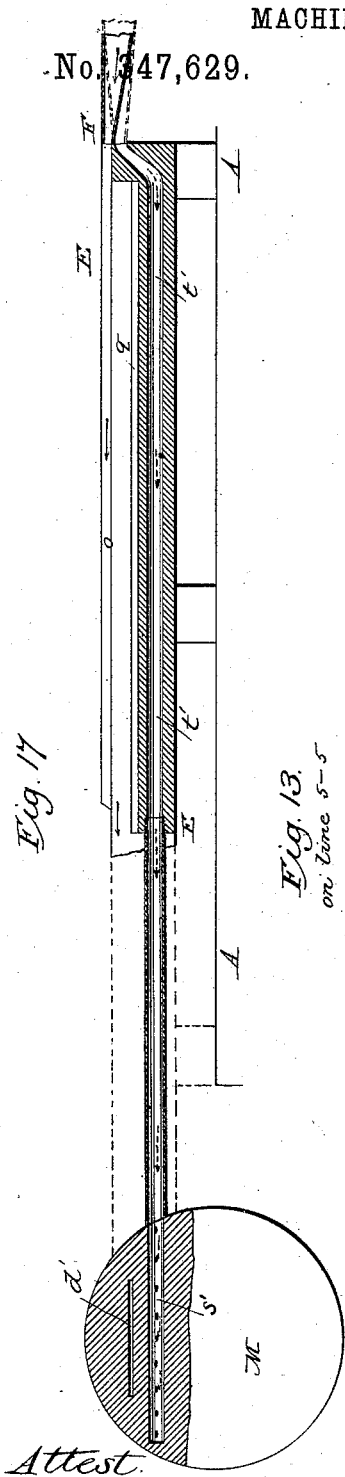
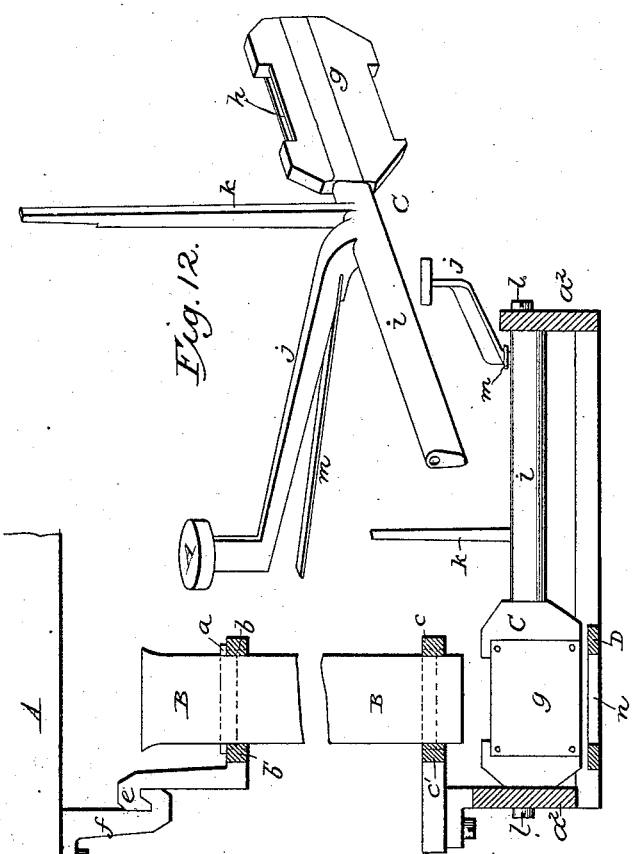
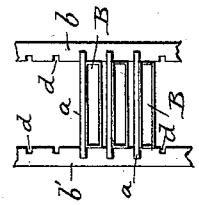
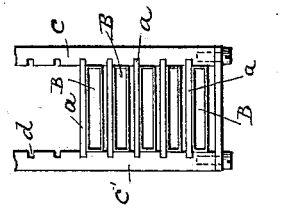
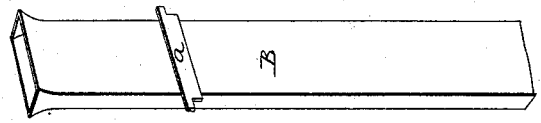

(No Model.) 12 Sheets—Sheet 7.
O. MERGENTHALER.
MACHINE FOR PRODUCING TYPE BARS.
No. 347,629. Patented Aug. 17, 1886.
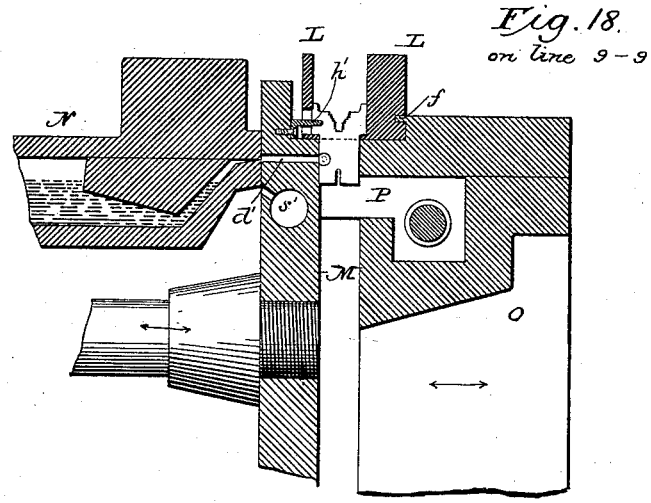
Fig. 18.
on line 9—9
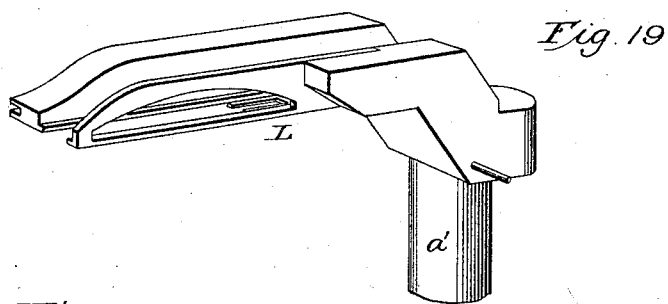
Fig. 19
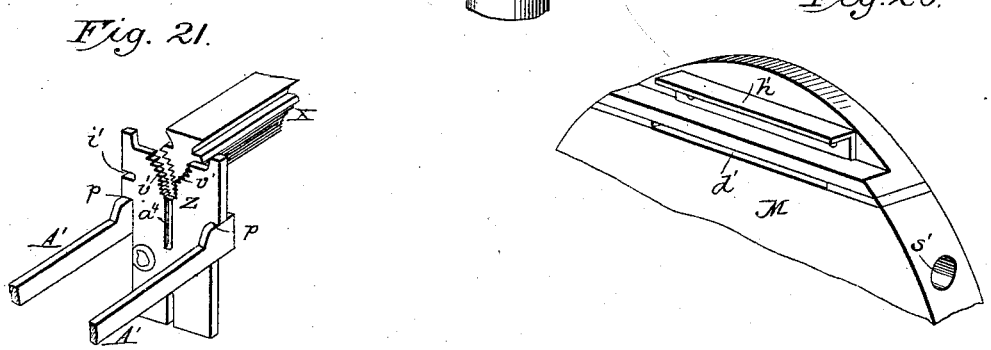
Fig. 21.
Fig. 20.
Attest
Sidney P. Hollingsworth
Wm L Kennedy
Inventor
Ottmar Mergenthaler
By his Atty.
Philip T. Dodge (No Model.) 12 Sheets—Sheet 8.
O. MERGENTHALER.
MACHINE FOR PRODUCING TYPE BARS.
No. 347,629. Patented Aug. 17, 1886.
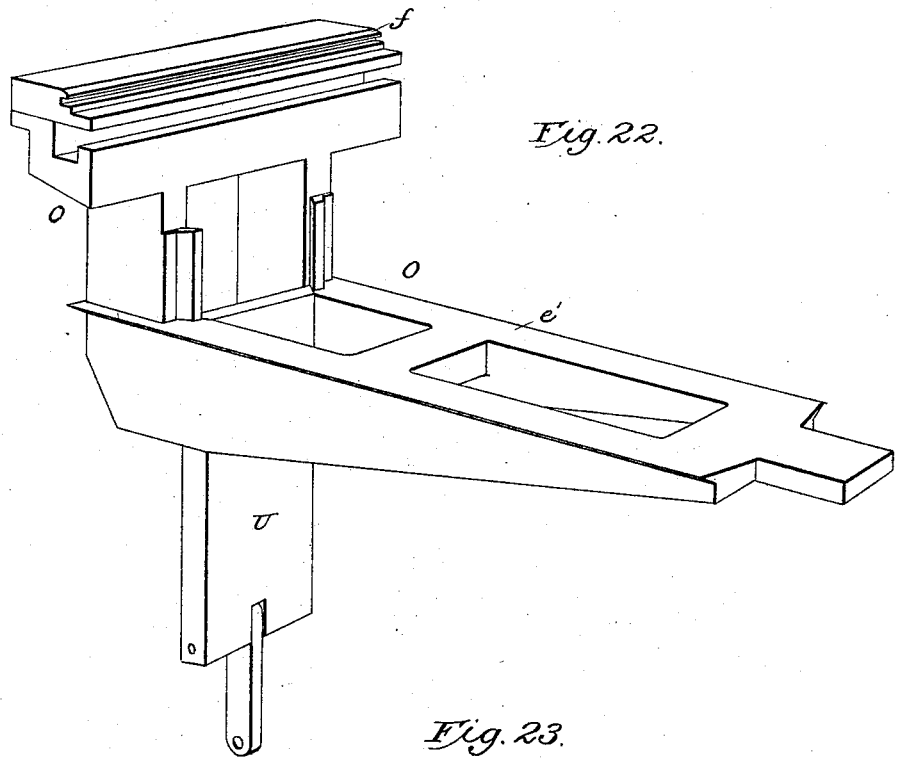
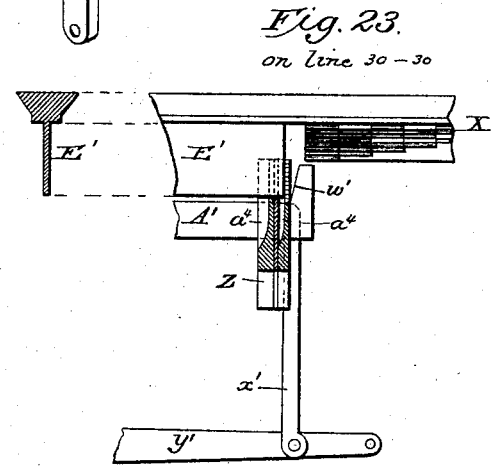
Attest
Sidney P. Hollingsworth
Wm E Kennedy
Inventor
Ottmar Mergenthaler
By his Attorney
Philip T. Dodge

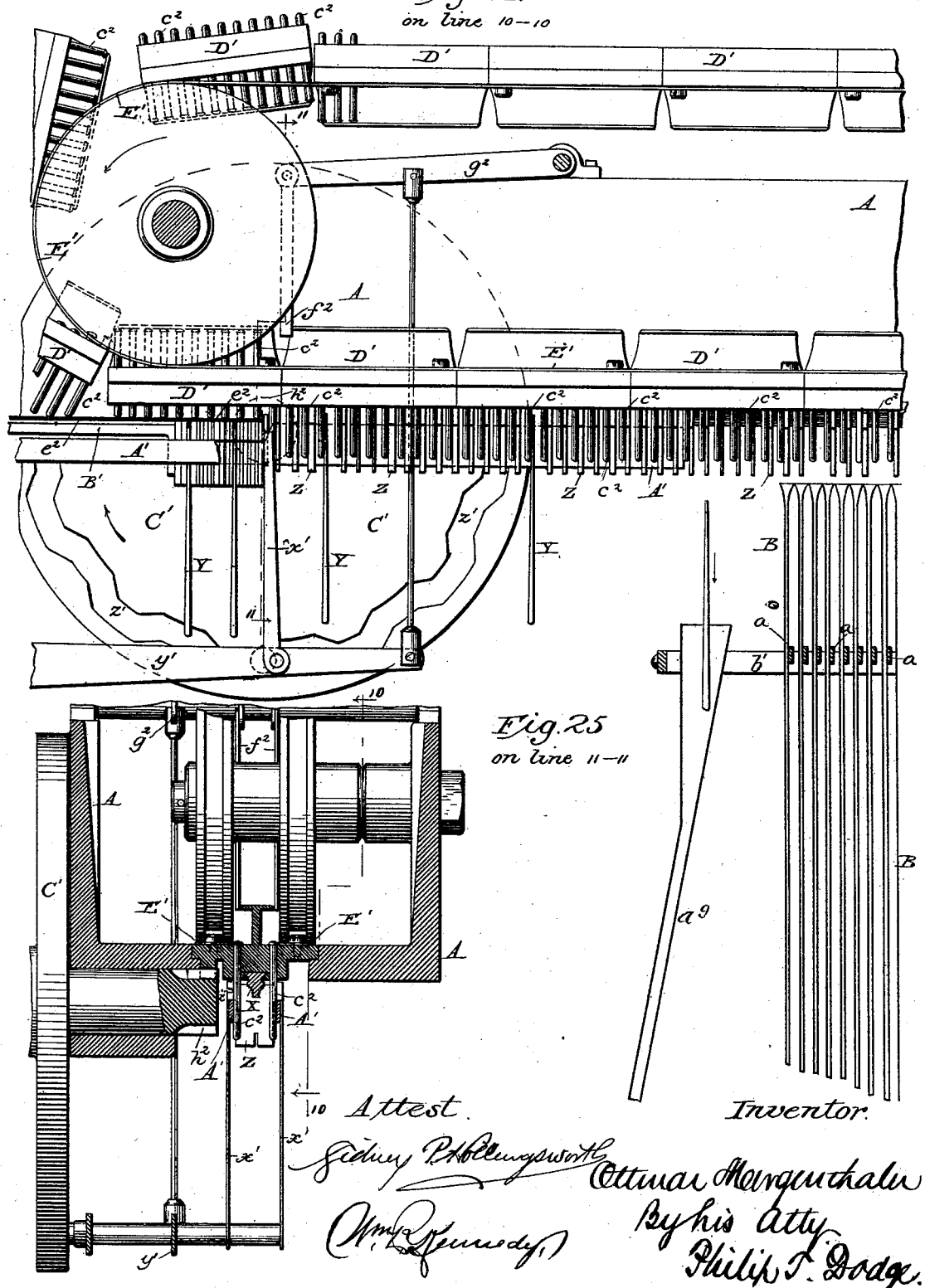

(No Model.)
12 Sheets—Sheet 10.
O. MERGENTHALER.
MACHINE FOR PRODUCING TYPE BARS.
No. 347,629.  Patented Aug. 17, 1886.
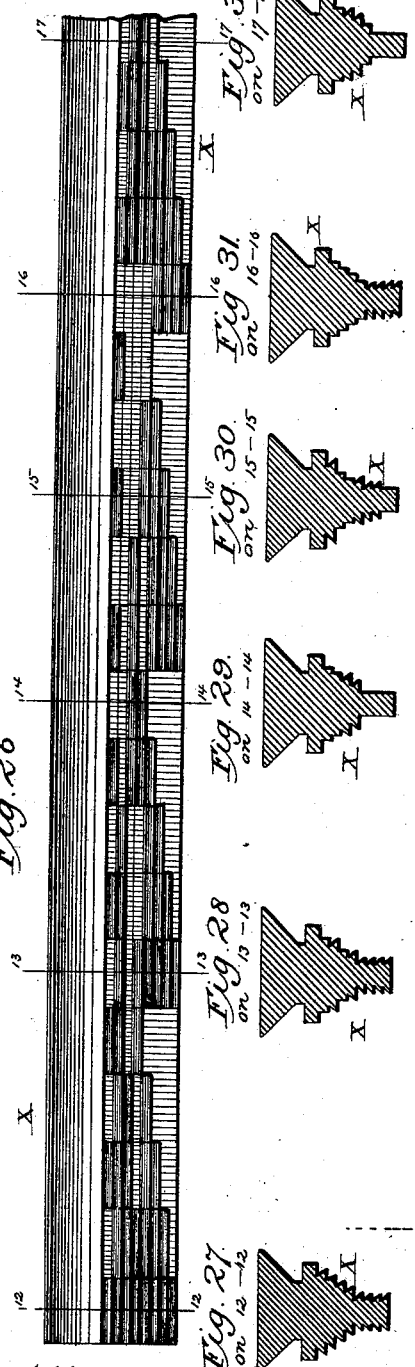
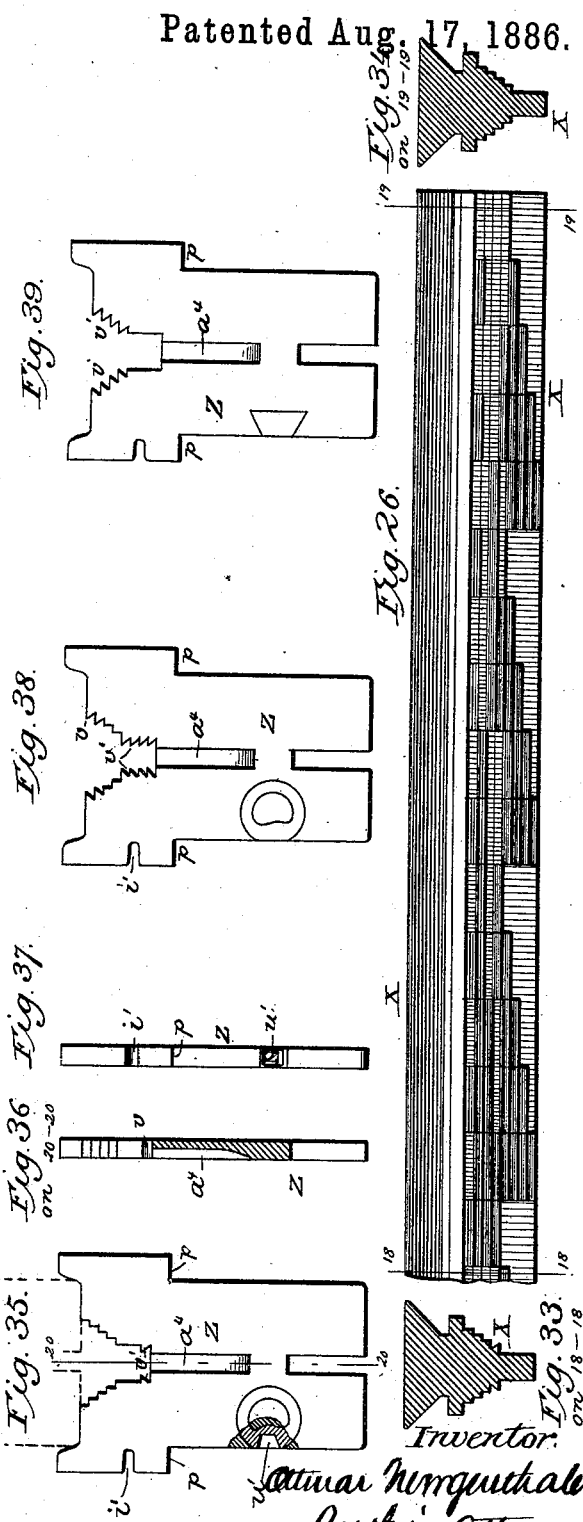
Attest.
Inventor.

(No Model.) 12 Sheets—Sheet 11.

O. MERGENTHALER.
MACHINE FOR PRODUCING TYPE BARS.

No. 347,629. Patented Aug. 17, 1886.

on line 9—9

Attest.
Sidney P. Hollingsworth
Wm. C. Kennedy

Inventor
Ottmar Mergenthaler
By his Attorney
Philip T. Dodge.

(No Model.) 12 Sheets—Sheet 12.
O. MERGENTHALER.
MACHINE FOR PRODUCING TYPE BARS.
No. 347,629. Patented Aug. 17, 1886.
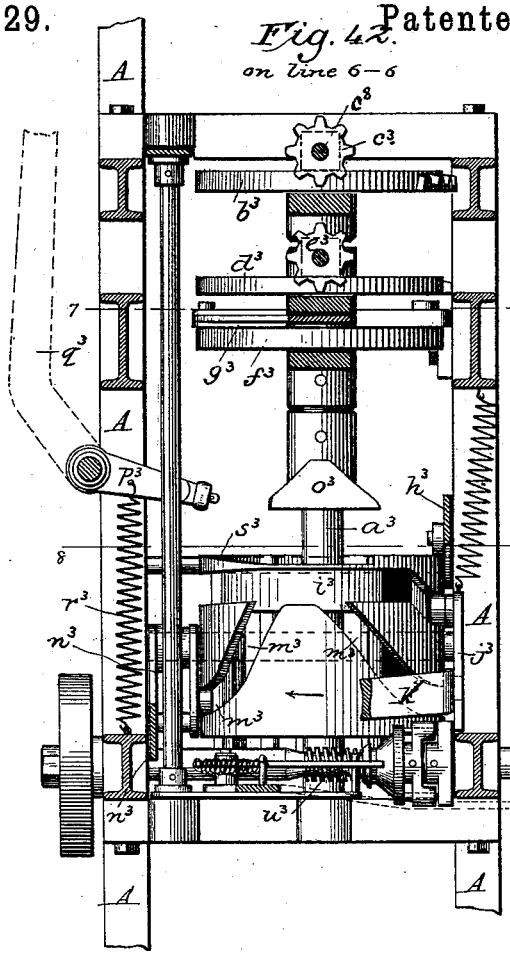
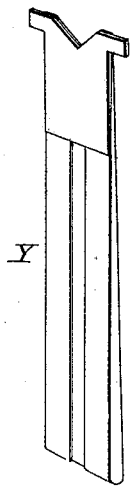
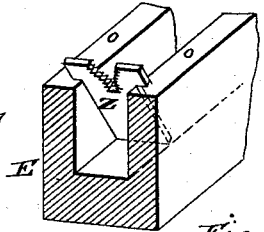
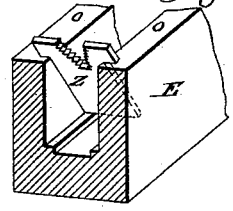
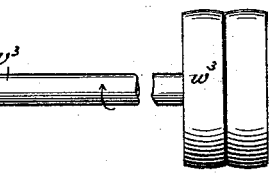
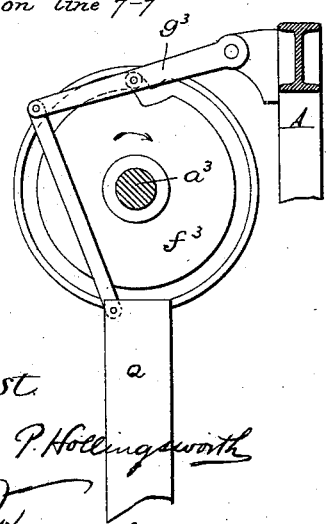
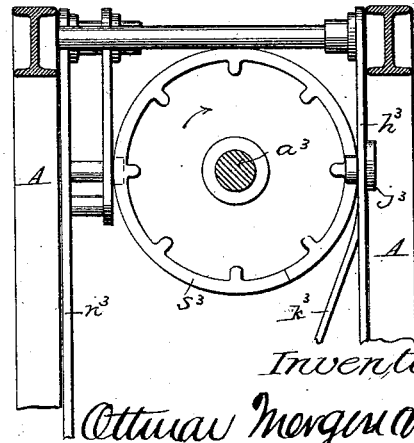
Attest:
Sidney P. Hollingsworth
Wm. D. Kennedy
Inventor:
Ottmar Mergenthaler
By Philip T. Dodge
Atty

UNITED STATES PATENT OFFICE.

OTTMAR MERGENTHALER, OF BALTIMORE, MARYLAND, ASSIGNOR TO THE NATIONAL TYPOGRAPHIC COMPANY.

MACHINE FOR PRODUCING TYPE-BARS.

SPECIFICATION forming part of Letters Patent No. 347,629, dated August 17, 1886.

Application filed October 23, 1885. Serial No. 181,169. (No model.)

*To all whom it may concern:*

Be it known that I, OTTMAR MERGENTHALER, of the city of Baltimore and State of Maryland, have invented certain Improvements in Machines for Producing Type-Bars, of which the following is a specification.

This invention relates to mechanism for producing printing-bars or type-bars, each bearing on one edge a justified line of characters, and adapted to be used in place of the movable type commonly used by the printer. It has reference primarily to improvements in that class of machines originated by myself, and represented in Letters Patent dated May 12, 1885, No. 317,828, in which finger-keys control mechanism whereby disconnected matrices or type are selected, assembled, and justified, the justified line presented to a casting mechanism, by which the printing-bar is formed, and finally the types or matrices distributed to the magazines whence they started.

The improvements relate to the construction and arrangement of the magazine-tubes; also, to a key mechanism for delivering the matrices from the magazine; also, to mechanism whereby a blast is applied to carry the type delivered from the various magazines to the point of assemblage, and in various details relating thereto; also, to improvements in the casting mechanism; also, to improvements in the distributing mechanism, and in the matrices for use therewith.

While I have represented and will particularly describe my improvements in connection with female type or matrices and mechanism for producing metal castings directly therefrom, it is to be distinctly understood that the selecting, assembling, justifying, and distributing mechanism may all be used without change in connection with type of the male order for producing line-impressions in papier-maché, wood, or like materials to form type-matrices.

Figure 40:
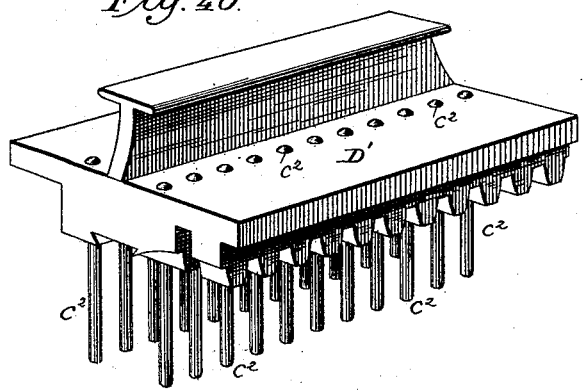
Figure 41:
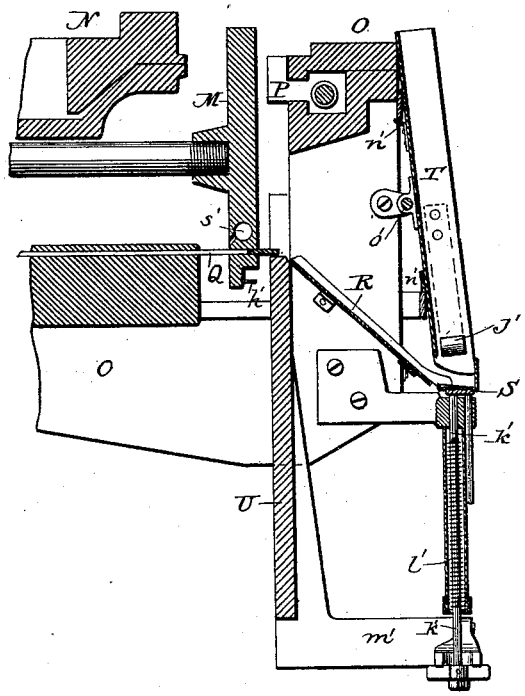

In the accompanying drawings, Figure 1 is a front elevation of the entire machine; Fig. 2, an end elevation of the same, a portion of the frame being broken away to expose other parts to view. Fig. 3 is a top plan view, partly in section, on the line 1 1 of Fig. 4, showing the construction and arrangement of the finger-keys and the attendant parts, by which the type are delivered from the magazine-tubes to the supporting-rails and carried over the latter to the point of assemblage or composition. Fig. 4 is a vertical section on the line 2 2 of the preceding figure. Fig. 5 is a vertical section on the line 3 3 of the preceding figures, showing the construction of the key mechanism and attendant parts for delivering the matrices from the magazine to the carrier. Fig. 6 is a transverse vertical section on the line 4 4 of the preceding figure. Figs. 7 and 8 are respectively a vertical and a horizontal section of one of the magazine-tubes. Fig. 9 is a top plan view of the guide or carrier rails, upon which the type are delivered from the magazine, together with the devices for assembling or composing the type. Fig. 10 is an elevation of the devices for delivering the space-bars to the line of type. Fig. 11 is a vertical cross-section of the same on the line 21 21. Fig. 12 is a perspective view of one of the finger-keys, showing the spring by which it is lifted and the vertical passage by which the delivery of the type from the magazines is secured. Fig. 13 is a transverse vertical section on the line 5 5 of Fig. 1, showing the manner in which the magazine-tubes and key mechanism are suspended from the main frame. Fig. 14 is a perspective view of one of the magazine-tubes. Figs. 15 and 16 are top plan views of the supports for the upper and lower ends of said tubes. Fig. 17 is a longitudinal vertical section on the line 2 2 of Fig. 9, showing the means for delivering air to the mold to reduce its temperature. Fig. 18 is a transverse vertical section on the line 9 9 of Fig. 1 through the casting and clamping mechanisms with the type in position and the parts adjusted to perform the casting action. Fig. 19 is a perspective view of the lifting or transfer rails by which the type are carried from the casting mechanism to the distributing mechanism. Fig. 20 is a perspective view of the upper portion of the mold. Fig. 21 is a perspective view showing one end of the distributing-rail, and also the rails by which the type are delivered thereto. Fig. 22 is a perspective view of the sliding portion of the main frame by which the type-clamp and the justifying-slide are carried. Fig. 23 is a longitudinal vertical section on the line 30 30 of Fig. 2, showing the parts represented in Fig. 21, and also the lifting device by which the type are transferred from the sustaining-rails to the distributing-rail. Fig. 24 is a side elevation of the forward end of the distributing mechanism, one of the guide-rails being removed so that the parts may be viewed on the line 10 10 of Fig. 25. Fig. 25 is a transverse vertical section of the distributer on the line 11 11 of the preceding figure. Fig. 26 is a side elevation of the distributing-rail, broken in two that it may be shown on a larger scale. Figs. 24 to 34 are cross-sections of the rail on the lines thereon indicated. Figs. 35, 38, and 39 are side views of the type, illustrating a few of the various combinations of teeth for effecting the distribution. Fig. 36 is a vertical section of the type on the line 20 20 of Fig. 35. Fig. 37 is a face or edge view of the type. Fig. 40 is a perspective view of one of the carrier-blocks by which the type are advanced along the distributing-rail. Fig. 41 is a vertical cross-section through the casting mechanism and adjacent parts on the line 9 9 of Fig. 1, showing the delivery of the complete typed bars to the galley in which they are assembled. Fig. 42 is a vertical cross-section on the line 6 6 of Fig. 2, showing the cams and their connections for giving motion to the various operative parts. Fig. 43 is a horizontal section on the line 7 7 of the preceding figure, showing the devices for operating the slide by which the type-bars are ejected or delivered. Fig. 44 is a section on the line 8 8 of Fig. 42, showing particularly the pump-operating cam. Fig. 45 is a perspective view of one of the space-bars. Figs. 46 and 47 are views of the type-guide in modified forms.

*Main frame.*—A represents a rigid metal frame, which may be of any appropriate form and construction, provided it is adapted to give support to the various operative parts hereinafter described.

*Magazine.*—B represents the magazine designed to receive and hold the type, composed of a series of independent vertical tubes, each of which is made internally of suitable size to receive the particular type which it is designed to contain. These tubes are each drawn from sheet metal upon or over a mandrel and through a suitable die, the result being a smooth, seamless, and perfectly true conductor through which the type will pass without danger of stoppage therein. The upper end of each tube is enlarged or flared, as represented in Figs. 1, 5, 13, and 14, in order that the type may be certain to enter freely therein. Each tube is provided near its upper end with studs or ears $a$, projecting from its opposite edges. These studs may be applied in any suitable manner; but I prefer to solder or braze a metal strip to the side of the tube, as shown in Figs. 13 and 14, allowing its two ends to project. The tubes are arranged side by side in a vertical position, and confined at their upper ends between bars $b\ b'$, and at their lower ends between bars $c\ c'$, which are notched to receive their edges, as shown in Figs. 15 and 16, the bars being confined against the opposite edges of the tubes by means of screws at their ends, as shown in Fig. 16. The upper bars, $b\ b'$, are provided with notches $d$, to receive the ears of the tubes, whereby the latter are maintained at the proper distance apart. The upper bar, $b'$, is provided with hook-shaped arms $e$, which engage corresponding arms, $f$, applied to the upper overhead portion of the main frame, the entire magazine being in this manner suspended from the frame, from which it may be unhooked and removed at will. The employment of separate magazine-tubes permits the removal of either tube independently of the others, thus allowing repairs to be conveniently made, if necessary.

*Type-discharging mechanism.*—Below the magazine I locate a series of oscillating-keys, C, for the purpose of delivering the type, one at a time, from the lower ends of the respective tubes. These keys are pivoted, as hereinafter described, in a supporting-frame, $a^2$, which is secured to and carried by the bar $c'$, attached to the magazine-tubes, as plainly represented in Figs. 13 and 16, the entire keyboard being thus sustained by means of the tubes, so that it may be removed therewith from the machine. Each of these keys is constructed in the form represented in Fig. 12, and consists of a body portion, $g$, provided with a vertical slot or opening, $h$, to permit the passage of the type therethrough, a horizontal shaft or spindle, $i$, an arm or finger-piece, $j$, extending laterally from the shaft, and an upright arm, $k$, the entire key being preferably forged or cast in one piece. The keys are arranged one beneath each of the magazine-tubes, and are mounted at their ends on horizontal pivots $l$, located midway of their height—that is to say, between the upper and lower edges of the slotted body, as shown in Fig. 13—so that when oscillated by the finger-piece the upper edge of the slotted portion will move in one direction and the lower edge in the opposite direction. Each key is provided with a spring, $m$, applied as in Fig. 12, or in any other suitable manner, to lift the finger-piece and cause the slot or passage $h$ to register with the magazine-tube above, so that the type may descend from the tube into said slot. Beneath the series of keys I arrange a stationary plate, D, provided with slots or openings $n$, located in vertical planes falling between the magazine-tubes, or, in other words, out of register therewith. Each key when released assumes the proper position to permit a type to descend into its slot, the type passing downward until it bears at the lower end upon the plate D, between two adjoining slots. When the key is depressed, the slotted body is oscillated or rocked, so that the lower end of its slot is brought directly over one of the openings $n$, thereby allowing the type to drop by gravity out of the key and through the opening. At the same time that this action occurs, and before the type is discharged, the upper edge of the key tips sidewise out of line with the tube, so that the next type descending in place of the one discharged will bear upon the upper edge of the key, and be sustained thereby in the manner represented in Fig. 5 until the key assumes its original position, whereupon the type will descend into the key in the manner before explained.

From the foregoing it will be observed that the slotted oscillating key serves as an escapement, receiving the type, one at a time, from the tube and delivering them through the openings in the plate D. It is preferred to proportion the parts in such manner that the type within the key will extend above its upper edge and support the next type in the column, as shown in Fig. 5, until the key is operated.

Referring to Figs. 1, 3, 6, and 12, it will be seen that the arms or finger-pieces $j$ are extended obliquely, instead of at right angles, to the axis of the key, and that they are attached to the respective keys at different points in their length. This construction is adopted in order that the keys may be arranged side by side in close order without having the finger-pieces interfere with or overlie each other, as represented in Fig. 3. On referring to this figure it will be seen that the finger-pieces of the adjoining keys do not immediately adjoin each other, but are separated by finger-pieces on other keys. By thus alternating the finger-pieces I avoid the necessity of having them overlap each other, and leave each finger-piece free to receive the necessary vertical motion.

*Assembling or composing mechanism.* — Beneath the plate D, I locate a horizontal guide or channel, E, to receive the type as they are delivered, one at a time, through the plate, and conduct them to the point at which they are assembled or composed. This conductor E, which extends beneath the entire series of magazine tubes and keys, consists, as shown in Figs. 1, 3, 4, 5, 6, 9, and 10, of a plate grooved or channeled longitudinally in its upper side, its walls presenting horizontal rails or shoulders $o$, to receive and sustain the type, which are constructed, as shown in Fig. 35, &c., with external shoulders $p$ near their upper ends to bear upon the guides. The type are made of such size and form that they will fit loosely within the guide or channel, filling the same transversely. When dropped through the plate D, they descend into the guide, and are maintained in an upright position therein by means of their shoulders $p$ bearing on the rails or guides $o$, as plainly shown in Figs. 1, 5, and 6.

For the purpose of preventing the type from turning, so as to disengage their shoulders, and also to prevent them from being driven out of the proper position by the blast which moves them, I provide in the bottom of the guide or channel a longitudinal rib or rail, $q$, which enters a notch formed for the purpose in the lower end of the type. This rail is commonly made of such height as to sustain the lower edge of the type and keep the latter in a slightly-inclined position, as shown in Figs. 5 and 6. While this is a desirable feature in that it prevents the possible cramping or binding of the type during its movement through the guide, it is to be understood that it may be omitted, or that the bottom rail may be of such height as to permit the type to hang in a vertical position. The guide or channel E is extended forward beyond the magazine, as shown in Figs. 1 and 9, in order to permit the assemblage of the type thereon in the form of a line.

*Pneumatic delivery.*—For the purpose of advancing the type through the guide or channel to the point of assemblage, I propose to make use of a blast of air, gas, or other equivalent fluid directed longitudinally through the channel. This blast may be continuous or intermitting in its action, and it may be applied wholly from the outer end of the channel, or applied at various points in its length, as preferred. I recommend the construction shown in Figs. 3, 4, and 9, in which F represents a delivery-nozzle connected by a conductor, G, with a blast-fan, H, as shown in Fig. 1, or with any other suitable source of fluid-supply. The nozzle F is mounted on horizontal pivots $r$, so that its forward end may be lifted into communication with the type-channel or depressed so as to divert the blast therefrom, the means for thus operating the nozzle being hereinafter explained. The blast passing forward lengthwise through the channel acts upon the type descending therein, and drives them forward with great rapidity one after another to the assembling point.

In practice it is found that with a blast properly graduated the type will be driven forward in the proper sequence, although they may be discharged into the guide in rapid succession. Were a continuous blast employed it would act against the type during their descent through the keys and the plate D, and have a tendency to cause them to bind therein in such manner as to retard their descent and endanger their falling in an improper position into the guide. For this reason I prefer to use an intermitting blast, and to control the same by means of the finger-keys in such manner that the blast will be stopped during the depression of the key and until the type has assumed its proper position in the guide, and then act to advance the type during the rise of the key. I propose to use for this purpose devices of any suitable character connected with the keys to control the blast, but I recommend as the most simple construction at present known to me the arrangement shown more particularly in Figs. 3 and 4, in which it will be seen that the upright arms $k$ of the keys are all seated loosely in notches in the side of a horizontal bar, $t$, which is pivotally united to an arm, $u$, secured to the vibrating air-nozzle F, so that whenever a key is operated its arm $k$ will cause the bar $t$ to depress the nozzle and divert the current from the type-passage, the release of the key being followed by the return of the nozzle under the influence of a spring, $b^2$, to its original position (represented in Fig. 4,) so that the blast is directed against the type which was discharged into the channel by the depression of the key. The notches in the bar $t$ are elongated, as shown in the drawings, on the rear side of the arms $k$, so that when the bar is moved by one key it will have no effect upon the others.

It will be perceived that under the above arrangement each type is permitted to descend to its place in the guides entirely free from the influence of the blast.

In order to secure the most certain and uniform action of the machine, I find it desirable to arrange the magazine-tubes in the order of their width—those which are to contain the largest type being arranged nearest the blast-nozzle, so as to receive its full force and effect. It is found that when thus arranged the large type which require the application of the greatest power may be advanced with certainty and rapidity to the required point.

For the double purpose of assembling the type in a compact line and of advancing the entire line at the required time to the casting mechanism, I locate above the type-guide or channel, beyond the magazine, two dogs or pawls, H′, attached to an arm on a horizontal bar, I, arranged to slide in a direction parallel with the type guide or channel. The bar may be of dovetail form and seated in a corresponding groove in the outside of the guide, as shown in Fig. 10, or it may be otherwise supported.

For the purpose of driving the type forward between the ends of the pawls, I provide two blast-pipes, J, connected, as shown in Figs. 3, 4, and 9, with the pump before alluded to or other source of air-supply. These conductors deliver two jets against the rear face of the type after it has been advanced past them by the action of the first blast or jet, insuring the advance of the type beyond the ends of the pawls, which close behind them under the influence of a spring, $w$.

While I prefer to use the two blast-pipes J in the manner shown in the drawings, it is to be understood that any equivalent arrangement may be employed, the essence of the invention in this regard consisting in the employment of a secondary blast to advance the type beyond the point to which they are advanced by the primary blast. The sliding bar I is urged backward by means of a weighted cord, $x$, as shown in Figs. 1 and 9, and is driven forward at frequent intervals a short distance by means of a revolving cam, $y$, which acts against a roll, $z$, on the side of the bar, as shown in Fig. 9. Through the action of this cam the pawls are caused to advance the line of type step by step as the individual type are added at the inner end. A handle, K, applied rigidly to the bar serves as a means by which it may be advanced to the left a distance much greater than that to which it was moved by the cam in order to cause the dogs H′ to force the line of type forward over the guide to the casting mechanism. The advance of the type during assemblage is resisted by a yielding finger or resistant, $a^3$, such as described in application No. 165,138.

*Casting mechanism.*—At the left of the type guide or channel I locate clamping, justifying, and casting devices of essentially the same construction as those represented in my application for Letters Patent filed on the 11th day of May, 1885, No. 165,138, and which I will now describe so far as is necessary to an understanding of the present improvements. Opposite the end of the stationary type-guide E there is a head, L, such as shown in Fig. 19, slotted longitudinally and vertically, so as to form in effect a continuation of the guide, that it may receive and sustain the line of type as they are delivered from the guide by the pawls H′, the type being sustained therein by means of their external shoulders in essentially the same manner as in my previous machine, and as plainly represented in Fig. 18. This head is attached to a vertically-reciprocating rod, $a'$, by which it is raised at the proper time to lift the type from the casting to the distributing mechanism. Immediately below and behind the lifting-head L is located a mold, M, in the form of a vertical disk, having a mold chamber or slot, $d'$, extended horizontally therethrough, its form and size being identical with that of the required type-bar. Behind the mold there is located a melting-pot, N, provided with a force-pump, such as represented in application No. 165,138, or of other suitable form, and with a narrow delivery-orifice through which molten metal may be discharged into the mold and against the line of type, which are at the time presented directly against the opposite face of the mold, their characters registering with the mold proper, as shown in Fig. 18.

For the purpose of forcing the type tightly against the face of the mold and of insuring their exact alignment, I provide an outside clamping-head, O, of the form shown in Fig. 22. This head has a flat vertical face adapted to bear against the outer edge of the line of type, as shown in Fig. 18. It is sustained by means of a horizontal arm, $e'$, formed at its under side, as in Fig. 24, and extended horizontally into suitable grooves or guides in the main frame, so that the head of the clamp may be moved to and from the mold.

For the purpose of confining the type laterally against each other—that is to say, in the direction of the length of the line—the main clamp O is provided with supplemental clamps or jaws, P, which are constructed and operated in the same manner as those in application No. 165,138.

In order that the lifting-head L, in which the type are for the time being sustained, may be brought to the exact position required, I provide the clamp O on its inner side with a horizontal lip, $f'$, which enters a corresponding groove formed in the head L, as plainly represented in Figs. 18 and 19. When the clamp recedes at the completion of the casting operation, this lip is withdrawn from the head, leaving the latter free to rise.

As an additional means of securing the exact adjustment of the type, I provide the upper edge of the mold with a rib, $h'$, which passes through an opening in the side of the head L into a notch, $i'$, formed in the edges of the type, as represented in Figs. 18, 35, &c. The mold is mounted on a horizontal shaft and receives not only an intermitting rotary motion, but also a reciprocating motion in a horizontal direction, as in my former machine. It is this reciprocating motion, which occurs at a different time from the rotary motion, that permits the rib $h'$ to engage and disengage the type. The melting-pot is also arranged to slide horizontally to and from the mold, as in my previous machine, in order to permit the retreat of the mold, and to release the latter in order that it may be rotated to bring the mold opening and casting therein opposite the ejector-plate Q, as shown in Fig. 41. This ejector-plate is arranged and operates in the same manner as that in my previous application, forcing the casting or type-bar out of the mold on the front side, whence it falls onto an inclined supporting-plate, R, forming one of the present improvements. At the lower edge of the plate R there is a vertically-reciprocating plate, S, attached to a vertical guide-rod and operated as hereinafter described. Directly above the plate S there is an upright galley or receiver, T, open at the lower end and provided at its two sides with inwardly-projecting spring-hooks $j'$, beveled on their lower faces. The plate S is attached to a vertical guide-rod, $k'$, and is lifted by means of a spiral spring, $l'$, surrounding said rod and acting against the pin or collar thereon. The depression of the plate is effected by an arm, $m'$, extending from the vertically-reciprocating justifying-plate U, hereinafter described. When the type-bar or casting descends the plate R, it is received upon the plate S. When the justifying-bar U rises, it releases the rod $k'$, whereupon the spring lifts the plate S, so as to carry the type-bar into the galley and above the springs $j'$, by which it is engaged and sustained, the plate S descending in due time to receive the next bar. In this manner the bars are assembled in the order of their production in the form of a column in the galley, ready for immediate use, if desired. The galley may be fixed permanently in position on the machine, but it is preferred to adapt it for instantaneous removal with the bars therein. To this end it may be attached in any suitable manner, but the arrangement shown in Fig. 41 is found to give satisfaction. As shown in this figure, the galley is provided with lips $n'$, which engage shoulders on the main clamp, and with an ear to receive a fastening-pin, $o'$, which enters studs or ears on the clamp. The withdrawal of the pin permits the instantaneous removal of the galley.

In order to avoid the overheating of the mold when the machine is rapidly operated, I propose to make use of an air-blast. This is best applied by providing the mold, as shown in Figs 17, 18, and 41, with a transverse opening, $s'$, provided with numerous outlets through which the air may pass, and providing the frame of the machine with an air-passage, $t'$, one end of which communicates with the opening in the mold, while the opposite end is in position to receive the blast from the nozzle F when the latter is turned away from the type-passage. Under this arrangement it will be seen that the blast is applied alternately to the advancement of the type and to the cooling of the mold. If preferred, however, the blast for cooling the mold may be conducted directly from a fan or other source of supply.

*Justifying mechanism.*—For the purpose of producing the required spaces between the type-bearing characters and to permit these spaces to be uniformly increased in order to effect the justification of the line, I make use of expansible space-bars Y, substantially identical with those described in application No. 165,138, and application No. 162,714, filed April 17, 1885, consisting of a tapered or wedge-like body having a sliding connection with a plate applied to its side and tapered in the opposite direction so that the outer faces of the bar and the plate are at all times parallel, as shown in Fig. 45.

One feature of the present invention consists in an improved means for introducing these bars at the proper points in the line of type during the progress of the composition. The space-bars are constructed, as shown, with lateral suspending-shoulders at the upper end, and are suspended by these shoulders between stationary inclined rails V, located directly over the type guide or passage E beyond the magazines, as plainly shown in Figs. 1, 10, and 11. The space-bars descend by gravity toward the lower ends of the rails V, where the head of the forward bar enters a recess in a vertically-reciprocating slide, W, connected by a link to an elbow-lever, $p'$, which is in turn connected by a link to a finger, $q'$, having at its forward end a bar or finger-piece. This lever is commonly denominated the "space-key." When the space-key is depressed, the slide W carries the space-bar downward behind the line of assembled type. The dogs H', or the next advancing type, will disengage the space-bar from the slide, which then rises to receive the next space-bar. These devices for feeding the space-bars differ from those in application No. 165,138, in that the feed-slide is operated directly by the finger-key, instead of by the cam mechanism.

In order to permit the space-bars, which are of greater length than the type, to descend to their places, the bottom of the guide is cut away or left open from the point where they enter to the casting mechanism, in order that they may project below the same. The space-bars are advanced with the line of type, and are sustained and clamped in the same manner. After the type are in position opposite the mold, and after the lateral clamps have been advanced to the predetermined points, the series of space-bars are lifted to effect the justification or expansion of the line by means of the vertically-reciprocating plate U, which acts against their lower ends in the same manner as in application No. 165,138, the plate being mounted, as shown in Figs. 1, 22, and 41, in guides formed in the main clamping-head O.

The means by which the plate U is reciprocated will be hereinafter explained.

*Distributing mechanism.*—The distributing mechanism, which is fully represented in Figs. 1, 23, and 24 to 40, inclusive, resembles in its general construction or mode of operation that described in my application for Letters Patent filed on the 6th day of June, 1885, No. 167,859, but differs therefrom in that the shoulders of the type by which they are sustained and distinguished one from another are formed wholly on the inside instead of on the outside, as in the previous application. Each type consists, as shown, of a flat plate of brass or other suitable material having a thickness but slightly greater than that of the character which it bears. The type is preferably made of a length somewhat greater than its width, and is provided on opposite edges near the upper end with the sustaining-shoulders $p$, before alluded to. In one edge it bears the intaglio character or matrix $u'$, and also the notch $i'$, to receive the aligning device. In the lower edge it has a vertical central notch to co-operate with the guide-rail in the composing mechanism. The upper end has vertical edges of considerable length above the shoulders $p$, to afford an extended bearing in the magazine-tube and thus prevent the type from tipping or tilting cornerwise. As an additional means to this end, each type has its upper end recessed to receive the lower end of the next type above when they are arranged in a column in the magazine, as indicated in Fig. 6 and by the dotted lines in Fig. 35, each type thus assisting to guide the next.

In its upper end each type is provided with a vertical central notch, the edges of which are formed with teeth $v'$, to engage the horizontal ribs or teeth of the sustaining and distributing rail X. This rail is fixed horizontally in position in the upper part of the machine, directly over the months of the magazine-tubes, so that the type falling from the rail will pass into the mouths of the proper tubes.

In advance of the distributing-rail there are two stationary horizontal rails, $A'$, designed to sustain the type by their external shoulders until they are delivered to the end of the distributing-rail.

At the completion of the casting operation the head L, in which the line of type is sustained, rises to the position indicated by dotted lines in Fig. 1, flush with the outer ends of the stationary rails $A'$, forming a continuation thereof. A horizontal slide, $B'$, in the top of the machine, advancing at the proper time pushes the entire line of type and the intermediate space-bars forward out of the head L, between and upon the rails $A'$, as plainly represented in Figs. 21, 23, and 24. The slide $B'$ is urged constantly inward by a spring and consequently keeps the line of type pressed forward toward the inner end of the rails $A'$, which terminate in upright shoulders $w'$, whereby the forward type is arrested, as shown in Fig. 23. The rails $A'$ are below the level of the distributing-rail X, so that the type require to be lifted before they are transferred to the latter. This lifting of the type one at a time is effected by a vertically-reciprocating finger, $x'$, attached to an arm, $y'$, vibrated by means of a roller on its side entering a serpentine groove, $z'$, in the side of a wheel, $C'$, as shown in Figs. 1, 23, 24, and 25.

Each type lifted by the finger $x'$ is sustained at its outer edges on top of the shoulders $w'$ in position to be moved forward into engagement with the rail X. Were no provision made to the contrary there would be danger of the type adhering to each other, so that the lifting-finger $x'$ would raise two or more type at a time to the level of the distributing-rail. To avoid this difficulty, I locate centrally over the stationary rails $A'$ a third stationary rail, $E'$, which overlies the upper ends of the type to prevent them from being lifted. This rail terminates, as shown in Fig. 23, shortly in advance of the distributing-rail, so that a single type may be lifted between them. If this space were made sufficient to permit the elevation of the wide type, it would be so great as to permit the elevation of two or more of the thin type, and it is therefore necessary to provide against this contingency. To this end I groove each type vertically in one piece from the upper end downward, as shown at $a^4$, Figs. 34 and 35. These grooves are made of such form that the remaining portion, or portion opposite the groove, is of uniform thickness in all the type, the thickness being such that while any one type may pass upward between the upturned end of the rail $A'$ and the end of the rail $E'$, which latter enters the groove of the type, the second type is prevented from advancing until the first is out of the way. In this manner the thick and thin type are fed alike—one at a time.

The advance of the type to and along the rail until they reach the proper magazine-tubes is secured, as shown in Figs. 1, 2, 24, 25, and 40, by means of traveling plates $D'$, attached to an endless belt or chain, E', and provided with pendent pins $c^2$. The endless belt passes around guide-pulleys at opposite ends of the distributing mechanism, and is turned in such direction that the plates travel horizontally at the under side of the belt from the feed-finger, toward and over the magazine. The pins are arranged in pairs and suspended loosely within the plate by means of heads or enlargements on their upper ends, so that they may rise freely. As each plate descends at the forward end of the belt, its pins encounter a stationary plate, $e^2$, as shown in Fig. 24, whereby they are lifted upward through the plates in advance of the distributing-rail and of the point at which the type are lifted. This plate terminates, however, at such point that the pins are permitted to drop, one pair at a time, immediately behind the type after the latter have been lifted to the level of the rail, so that the type are carried by the advancing pins into engagement with the rail and advanced along the latter until they drop therefrom into the magazine. It will be observed that the pins act upon each type on opposite sides of the distributing-rail, as plainly shown in Fig. 25, the type being in this manner separated from each other and prevented from turning or twisting out of position during their advance. It is designed to have the pins drop into position by gravity; but in order to insure their descent I propose, as shown in Fig. 24, to make use of a depressing-finger, $f^2$, attached to a vibrating arm, $g^2$, which is connected with and operated by the arm $y'$, which operates the lifting-finger. Under this arrangement the elevation of each type is immediately followed by the positive depression of the pins in rear thereof.

The carrier-plates D' may be guided in any suitable manner during their advance; but I prefer to sustain their edges, as shown in Fig. 25, in guides or shoulders planed on the main frame. The advance of the plates is secured by providing them on one edge with a line of gear-teeth, which are engaged by a pinion, $h^2$, formed on the shaft of the cam-wheel C', before referred to, as shown in Figs. 24 and 25.

In manufacturing the type I find it most convenient to first cut the full complement of shoulders on the entire series, and afterward remove from the individual type such shoulders as are not required.

I will now describe the construction of the type and the rail to effect their distribution and their delivery at the precise points required. Each type has the opposite edges of its upper central notch provided with a series of duplicate undercut teeth or shoulders designed to engage corresponding teeth formed longitudinally on the sides of the supporting-rail X. Those type which bear the same letter are duplicates of each other in every respect, but the type which bear different letters differ from each other either in the number or arrangement of their sustaining-shoulders. By difference in arrangement is meant difference in the relative position or location of the shoulders. For example, type bearing different letters may each have four pairs of shoulders, but one will have them at the lower end of the notch while the other will have them at the upper end; or one will have them separated from each other vertically a greater distance than the other. By thus changing the number and arrangement of the shoulders I am enabled to produce a very large number of combinations, and thus to employ a very large variety of type, with the certainty that the distributing-rail will distinguish between one and another.

The distributing-rail is divided into a number of longitudinal sections equal to the number of magazine-tubes and to the different forms of type employed, each section being adapted to release one particular form of type—that is to say, the type bearing a particular character, and no other. These sections of the rail differ from each other like the type either in the number or the relative position of their teeth or ribs.

The rail is most conveniently constructed by planing or milling a series of continuous teeth therein from end to end, and subsequently cutting away the teeth at such points as are necessary. It is to be understood that the number and arrangement of the teeth on the various sections may be modified as convenience may dictate or circumstances require; but in practice I have found that the arrangement represented in the drawings will give satisfactory results.

Referring to Fig. 26 it will be seen that the first section of the rail to the left has eight teeth; the second section has the upper and lower teeth cut away, leaving six in immediate succession; the third section has two teeth cut away from the lower edge and one from the middle, thus leaving five, two of which are separated from the others by an intervening space; that the fourth section has but three teeth, there being a blank space at the top followed by two teeth in close proximity, a blank, and, finally, a third tooth. The next section has two teeth at its extreme top, and a single blank followed by the third tooth. If, now, a type, such as shown in Fig. 35, having but a single pair of undercut shoulders at the bottom of the notch, is applied to the rail, it will be suspended by the bottom ribs of the first section, but being carried thereover will be released and permitted to fall as soon as the second section is reached, for the reason that the latter has no sustaining-rib at the bottom. If a type, such as shown in Fig. 38, having four pairs of shoulders at the bottom and two at the top, be applied to the rail, it will remain in engagement and be suspended by one or another of the ribs until it reaches the tenth section of the rail, when it will in like manner be released. If a type, such as shown in Fig. 39, having four pairs of shoulders at the top, be applied to the rail, it will remain in engagement until the sixteenth section is reached, when it will be set free. It will be observed that certain of the type have, in addition to undercut shoulders, shoulders with vertical faces. These shoulders, which may be omitted, have no effect as regards the distribution. The grooves in the type may have vertical sides, so as to bring the undercut shoulders directly above each other in vertical lines; but it is preferred, as shown in the drawings, to have the upper edges of the slot diverge or incline outward, as under this construction it becomes possible to employ a much greater number of divisions or distinctive arrangements of teeth in a given length of rail, since the teeth of the upper or widened portion of the slot will pass downward over the ribs on the lower part of the rail without engaging therewith. In this connection the widening of the slot so as to increase the horizontal distance between the successive pairs of sustaining-shoulders is of great importance.

It will be readily understood that under my system a type may be sustained by different ribs or different numbers of ribs during its movement along the distributing-rail, and that its shoulders may be released at one time during its progress and re-engaged at another. It is this fact which permits the type to be sustained and carried past the many different sections of the rail to the point of release.

While it is preferred to have the sustaining-shoulders of the type beveled or undercut, after the manner of the dovetail, it will of course be understood that they may be modified in form at will. The suspending shoulders of the space-bars and the distance between the sustaining-rails A are made of such width that the space-bars are permitted to drop into the upper end of the tube $a$, as shown in Fig. 24, whereby they are directed to their sustaining-rails V.

*Driving mechanism.*—Motion is communicated to the various parts of the machine by a series of cams and wheels mounted on a single vertical shaft, $a^3$, as shown in Figs. 42, 43, and 44. This shaft is mounted in the main frame, and driven through a clutch mechanism and worm-gear in the same manner as in application No. 165,138; but it may be driven by mechanism of any other appropriate form. The top wheel, $b^3$, is provided with a few peripheral teeth, to actuate a pinion, $c^3$, on the wiper-driving shaft $c^8$, and is also provided with a flat delay-surface on its top, to engage the delay-surfaces of the pinion and hold the latter at rest during the time that the teeth are disengaged. These parts, which constitute a well-known form of stop-motion gear, impart an intermitting motion to the wiper-shaft. The wiper-shaft and its connections are not claimed as part of the present invention, as they will constitute features in a separate application for patent. The second wheel, $d^3$, is constructed in the same manner as the one above, and communicates motion to a stop-motion pinion, $e^3$, similar to that above described, on the shaft which carries the mold-wheel M. The disk or cam plate $f^3$ has in its upper face an eccentric groove to receive a roller on the arm $g^3$, which operates the ejector, as in Fig. 43, and on the former machine. Below the disk $f^3$ there is a cam, $o^3$, which lifts an arm, $p^3$, on the shaft of the arm $q^3$, connected to the slide which advances the type from the head L toward the distributer, in order to retract the slide after the delivery of each line and before the next line is presented to its action. The advance of the slide is effected by a spring, $r^3$, connected to the arm $p^3$ and the frame, as shown. The lower end of the shaft carries a hollow drum or barrel having various peripheral cams, as follows: first, at the upper edge the cam-tracks $s^3$, as shown in Fig. 44, to actuate the pump-lever $h^3$; second, below the upper edge the cam-groove $i^3$, which acts through a roller and a link, $j^3$, attached to the roller upon the lever $k^3$, which lifts the justifying-slide, so as to overcome the counterweight $l^3$ thereon and depress the slide after the casting is completed, and so also as to limit the speed at which the slide is raised by the weight; third, at the lower end a cam-groove, $m^3$, acting through a roller to lift the lever $n^3$, connected by link $t^3$ to the head L, which raises the type from the casting to the justifying devices. Below the cams the shaft carries the worm-wheel driven from the worm $u^3$, attached to one end of the horizontal driving-shaft $v^3$. This shaft is provided with a driving-pulley, $w^3$, as in Fig. 42, at one end, and also with a pulley, $x^3$, connected by a belt, $y^3$, to a pulley, $z^3$, mounted on the same shaft with a pulley, $a^5$, which is in turn belted to the wheel C', on the shaft of the distributer-driving wheel.

*Operation.*—The type, properly assorted, are placed one upon another in the respective magazine-tubes, the bottom type standing on top of the type previously delivered into the finger-key, and supported upon the slotted plate D, thereunder. The operator depresses the finger-piece of the key representing the first letter required, the result being to rock the key and cause its slotted portion to carry the type over the lower part of the opening in the plate D, through which it descends into the guide or channel thereunder, the next type in the series being in the meantime supported on the upper edge of the key until the latter is released and resumes its original position, whereupon the column of type descends, and the bottom type enters the key, taking the place of the one just discharged. At the instant that the key was depressed the blast-nozzle was turned out of connection with the type passage or guide, so that the type descending into the channel remained suspended therein by its shoulders and the bottom rail in the position shown in Fig. 4. The elevation of the key is followed by the elevation of the nozzle F, so that the full force of its blast is directed against the type, driving the same forward along the channel toward the assembling-point and past the ends of the secondary blast-nozzles J, by which its movement is continued past the pawls H'. The manipulation of the successive keys causes the succeeding type to be dropped in like manner into the channel and carried forward in the order of delivery behind those previously discharged. The pawls H', reciprocating lengthwise of the guide, feed the type forward, one after another, against the resisting arm at the front, causing them to form a compact line. Whenever in the course of composition it is necessary to introduce a space in the line, the operator depresses the space-key q', causing the slide W to lower a space-bar into position upon the guide immediately behind the type last delivered. When a suitable number of type have been selected and assembled to form a line, the handle K is forced to the left, causing the bar J to advance the pawls H', which in turn force the line of type and space-bars along the guide into the head L immediately in front of the mold. The clamping-head O advances toward the type from one side, while the mold advances on the opposite side, and at about the same time the lateral clamps move inward to the limits of the predetermined line. As soon as the clamps are thus adjusted to determine the length of the line, the plate U rises, lifting the space-bars and causing them to spread or justify the line. The melting-pot having in the meantime advanced against the face of the mold, the pump is operated and the mold cell or cavity filled with molten metal, which forms a type-bar or bar bearing on its edge in relief an impression of the entire line of matrix-type, as in my previous machine. The clamp, the melting-pot, and the mold now retreat, the mold receives a half-revolution, and the ejector-bar is advanced to drive the cast from the mold, after which the parts in due time resume their original position preparatory to the formation of the second bar. Immediately after the casting action the head L lifts the type to the distributing mechanism, the slide B advances and forces the type from the head to the primary rails of the distributer, and the head immediately descends to receive the type for the next line. The arm to resist the advance of the type during the course of composition, the indicator to guide the operator in selecting the proper number of type for each line, and the alarm to give notice when the proper limit is reached, are all constructed in the same manner as in application No. 165,138, and are not claimed as any part of the present invention.

*Modifications and equivalents.*—It is to be understood that the vibratory blast-nozzle is in effect but a valve actuated by the finger-keys to stop the passage of the blast through the type-guide during the entrance of the type, and that it may be replaced by any equivalent form of valve, of which there are many known in the art. It is also to be understood that while the stoppage of the blast during the admission of the type is recommended, the machine may be operated with a continuous blast.

While I recommend that the shoulders on the outside of the type and the rail in the bottom of the guide or passage be constructed in the form and arranged in the manner shown to maintain the type in an inclined position during their advance, it will be manifest to the skilled mechanic that the form may be modified, provided only the type are sustained at or near their two ends.

In place of using the rail, the channel or guide may be reduced in depth, so that the type will bear at their lower ends therein and assume an inclined position before the upper shoulders encounter the guide, as shown in Fig. 46, or made with bottom shoulders, as in Fig. 47.

By the expression "a horizontal guide or channel" as herein employed is meant a guide which is either precisely or approximately horizontal, a moderate deviation from a true horizontal position being immaterial.

Having thus described my invention, what I claim is—

1. The magazine for a type-composing mechanism, consisting of the series of independent vertical tubes and the transverse connecting-bars secured to the tubes at their upper and lower ends, substantially as described.

2. The combination, substantially as described and shown, of a main frame, the elevated distributing mechanism, the assembling mechanism, and the intermediate series of magazine-tubes connected with each other and attached to the frame by means, substantially as described, for instantaneous removal, whereby the entire magazine may be removed for inspection or to permit the introduction of another magazine.

3. In combination with the notched bars at the top and bottom, the removable magazine-tubes provided with projections to sustain them.

4. In combination with the magazine-tubes, the key mechanism sustained thereby.

5. In combination with the overhead frame, the magazine-tubes suspended therefrom, and the key mechanism sustained by the tubes, whereby the simultaneous removal of the magazine and the keys is permitted.

6. In combination with a magazine-tube, an oscillating key located thereunder, provided with a slot or recess for the passage of the type therethrough.

7. In combination with a magazine-tube, an oscillating key located thereunder, its upper edge acting directly to close the mouth of the magazine-tube and sustain the column of type therein.

8. In combination with a magazine-tube and a plate, thereunder perforated for the passage of the type, an intermediate movable key provided with a type-passage which registers alternately with the magazine above and the perforation in the plate below, whereby the matrices are delivered one at a time.

9. In combination with the magazine-tube above and a receiving throat or opening below, the intermediate key provided with a vertical type-passage and pivoted midway of its height, whereby its upper and lower edges are caused to move in opposite directions to register alternately with the magazine and the throat.

10. The feeding-key consisting of the body provided with a type-passage, a shaft or spindle, and a finger-lever rigidly connected thereto.

11. The series of oscillating keys with type-passages and lateral arms or levers arranged in parallel lines, the arm or finger-piece of one overlying the body of another, as described.

12. The finger-keys provided with vertical passages for the type and with the upright arms, in combination with the bar having elongated notches, the vibratory nozzle and its arm connected with the notched bar, as shown.

13. The series of oscillating keys with type-passages and rigid oblique arms or finger-pieces, their bodies arranged parallel with each other, and the arms alternated in arrangement, as described, so that the arms of adjacent keys do not lie adjacent to each other, whereby the arrangement of the keys in close order is permitted.

14. The combination, substantially as herein described and shown, of a stationary type passage or guide, a pipe or conductor for delivering a blast longitudinally through said passage, a series of magazine-tubes located above the passage, and a key mechanism, whereby the type are permitted to descend by gravity into the passage.

15. A continuous stationary type-passage and a series of magazine-tubes having their delivery ends directly over said passage, a blast-pipe to direct a blast longitudinally through the passage, key mechanism, substantially as described, to discharge the type one at a time into said passage, and mechanism, substantially as described, operated by the keys to stop the action of the blast during the descent of the type.

16. The longitudinal type-passage and the pipe directing a blast therethrough, in combination with a series of finger-keys to deliver type therein, and a single blast-stopping device, substantially as set forth, connected with and operated by the series of keys, whereby the action of either key is caused to stop the blast.

17. In a machine having a horizontal guide or channel into which type are delivered in an upright position, and in combination with said guide, a blast mechanism, substantially as described, which delivers the blast against the side faces of the type, whereby the type may be assembled side by side by the direct action of the blast.

18. In an assembling or composing mechanism, a horizontal guide or channel provided with longitudinal shoulders at its top to sustain the upper ends of the type, and a pipe to direct a blast lengthwise of said channel, whereby the type may be maintained in an upright position, delivered through the channel, and assembled side by side.

19. In combination with a horizontal type-channel and a pipe directing a blast therethrough, magazines and key mechanism, substantially as described, acting to deliver the type endwise into and across the channel, whereby they are presented in position to receive the blast on their side faces instead of their ends.

20. In combination with the type with sustaining-shoulders and the notch at the base, the guide or channel and the bottom rail to enter the base of the type and prevent the type from turning in the channel.

21. In combination with type having sustaining-shoulders, horizontal guides supporting the type both at the top and bottom in an upright slightly-inclined position.

22. In combination with the externally-shouldered type, the horizontal guide to support the shoulders and the bottom rail to sustain the lower end of the type.

23. In a mechanism for assembling type, a type-guide adapted, substantially as described, to maintain the type in an upright position, a pipe for delivering a blast to advance the type through the guide in an upright position, and detent devices, substantially as described, to engage the advancing type and prevent them from rebounding upon coming in contact with those which preceded them.

24. In combination with a type guide or channel, two blast-delivering throats located at different points in the length of the guide and directing their blasts in the same direction, whereby the type are subjected to their successive action.

25. In combination with a type channel or guide and a blast pipe or throat located at one end, a series of type-magazines adjacent thereto, those which contain the heaviest type arranged nearest the blast device.

26. In combination with a guide or channel adapted to sustain shouldered type in an upright position, as described, the two blast-pipes located in opposite sides of the channel and opposite each other, whereby the blast is delivered against the two edges of a type simultaneously.

27. The type guide or channel, in combination with the finger-keys to deliver type therein, the vibrating blast-nozzle, and devices, substantially as shown, connecting the keys with the nozzle, whereby the blast is diverted from the channel during the entrance of the type.

28. In combination with the type-channel, the vibratory blast-nozzle, the mold, and the air-passage from the nozzle to the mold, whereby the blast may be applied alternately for advancing the type and cooling the mold.

29. A type guide or channel through which the type advance in an upright position, in combination with a resisting-arm to arrest the advance of the type, and a blast device directing the blast lengthwise of the guide, whereby the type are assembled by the action of the blast side by side.

30. A type guide or channel, type shouldered to advance in an upright position therethrough, a blast-pipe directing air lengthwise of the channel, a resistant, as $a^8$, to arrest the advancing type, and a detent, H', to prevent the rebound of the type.

31. In combination with the type-guide and the yielding resistant, the pawls or detents H', and means, substantially as described, for imparting an automatic reciprocation thereto, whereby the type advancing between the pawls are carried forward in a compact line.

32. In combination with the type guide or channel, the two pawls, their carrier, and the weighted cord and cam for reciprocating the pawls.

33. In combination with the pawls and pawl-carrier, the weighted retracting-cord, the advancing cam, and the manual device for advancing the carrier beyond the point to which it is advanced by the cam, whereby the type are first assembled in compact order and subsequently advanced in a body.

34. In combination with the movable type-sustaining head, the clamp provided with the rib to engage the head, substantially as described.

35. In combination with the type, the mold provided with an aligning rib to engage the series of type, substantially as described.

36. In combination with the sustaining-head L, the clamp O, provided with the rib to engage the head, and the opposing mold provided with the aligning rib to engage the type.

37. In combination with a blast-delivery pipe, the type guide or channel having its bottom closed for a portion of its length and open for the remainder, whereby the type are relieved in part from the force of the blast and the introduction of long space-bars permitted.

38. The type having external sustaining-shoulders and a recessed upper end, as described, each type being adapted to receive the lower end of a second type, whereby the type are arranged to guide one another in the magazine.

39. A series of type having their ends adapted, substantially as described and shown, each to interlock at the lower end with the upper end of another when they are arranged in column form one upon another, whereby the type are prevented from turning cornerwise and binding in the magazine-tubes.

40. The series of externally-shouldered type provided with aligning notches $i$, adapted to register with each other when the type are assembled side by side.

41. A series of type differing in thickness according to the characters borne by them respectively, but all reduced to an equal thickness at one edge by a groove or recess, $a^4$, to permit the separating devices to remove one type at a time from the line.

42. A type having in its upper edge a flaring or V-shaped notch, with duplicate suspending shoulders in its edges, as described, whereby different pairs of opposing shoulders are separated horizontally different distances.

43. A type having in its upper edge a series of opposing shoulders arranged in pairs, two or more pairs separated horizontally an equal distance, and the remaining pairs separated horizontally different distances.

44. A type-distributing rail having its surface divided into longitudinal sections provided with longitudinal type-sustaining ribs or teeth, one section differing from another in the number of its ribs.

45. A type-distributing rail divided into longitudinal sections provided with longitudinal type-sustaining ribs or teeth at different heights, each section differing from every other in the number or the relative positions of the ribs, or both.

46. The sustaining-rail divided into longitudinal sections having longitudinal ribs, each section differing from all the others in the number or relative arrangement of its shoulders, or both, in combination with a series of type toothed to engage the rib, their teeth being arranged as to number and relative position so that type bearing the same character differ from all others so as to disengage from their individual section of the bar, and no other.

47. A distributing-rail provided with pairs of type-sustaining shoulders differing in number at different points in its length, in combination with a series of type provided with corresponding shoulders differing in number on the respective type.

48. A distributing-rail divided into two or more longitudinal sections, each section provided with two or more pairs of shoulders differing in their vertical arrangement from those on the other sections, in combination with a series of type, each provided with two or more pairs of shoulders differing in their vertical position or relation from those of the other type, whereby each type may be separated from others having a like number of shoulders.

49. The sectional distributing-rail having one or more pairs of ribs on each section in line with ribs of the next section and others out of line therewith, whereby the transfer of type from one section to the next is secured.

50. In combination with the distributing-rail, the traveling plates provided with independent gravitating pins to engage the type.

51. In combination with the distributer-rail, the traveling blocks, their gravitating pins and the plate $e^2$, to sustain the pins until they have advanced to the proper point for action.

52. In combination with the distributing-rail, the traveling plates, the type-advancing pins therein, and the reciprocating depressor $f^2$, to insure the descent of the pins.

53. The rails A', having the elevated delivery ends, in combination with the spring-actuated slide to advance the type, and the lifting-finger, whereby the type are lifted to and advanced upon the elevated ends of the rails.

54. In combination with sustaining-rails A', the lifting-finger and the overlying rail, to prevent the rising of any other than the forward type.

55. In combination with the distributer-rail and the lifting-finger, the rails A', and the traveling-plates D', provided with gravitating pins, the pin-depressing arm connected to and operated by the arm which carries the lifting-finger, whereby the descent of the pins is insured before a matrix is lifted behind them.

56. The combination, substantially as shown, of the casting mechanism, the ejector for delivering the castings therefrom, the galley provided with spring-catches or detents at its lower end, and the vertically-reciprocating carrier or lifting device to which the castings are delivered by the ejector, substantially as described and shown, whereby the castings are assembled automatically in the order of their delivery.

57. The rotary mold and the ejector Q, in combination with the inclined plate R, the lifting-plate S, and the galley provided with automatic dogs or catches in the lower end to retain the type-bars.

58. In combination with the type guide or channel, the rails V, to sustain the space-bars, the feed-slide W, and the finger-key connected with and arranged to operate the slide, substantially as described, whereby the operator is enabled to place the space-bars directly and instantly in line with the assembled type.

59. In combination with the rails V, to sustain the space-bars, the tube or guide extending upward therefrom, and the type-sustaining rails located above the tube and adapted, as described, to release the space-bars and permit their descent into the tube before releasing the type.

60. In combination with the distributing-rail, the pin-carrying plates D', the flexible bands having the plates secured thereto at one end, and the pulleys to guide said bands.

In testimony whereof I hereunto set my hand, this 24th day of October, 1885, in the presence of two attesting witnesses.

OTTMAR MERGENTHALER.

Witnesses:
ABNER GREENLEAF,
M. W. JOHNSON.